Oct. 11, 1955   W. A. POWER   2,720,620
DAMPING CIRCUIT FOR FORCED BALANCED GALVANOMETER SYSTEM
Filed Jan. 13, 1953
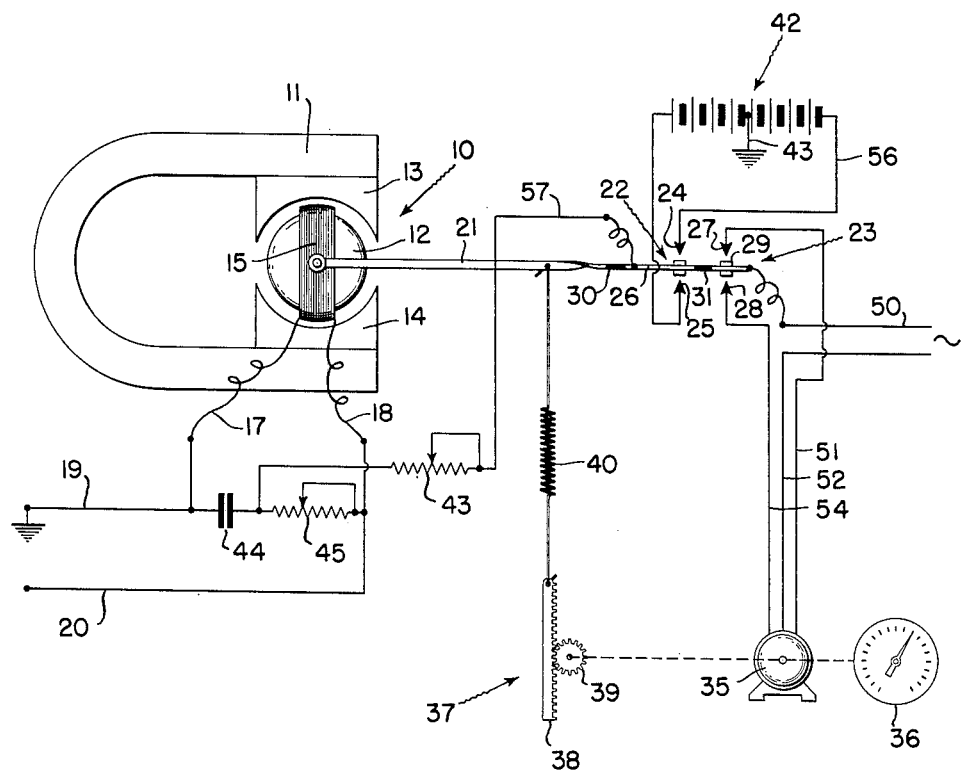
INVENTOR.
WILLIAM A. POWER
BY
*Arthur H. Swanson*
ATTORNEY.

United States Patent Office 2,720,620
Patented Oct. 11, 1955

2,720,620

DAMPING CIRCUIT FOR FORCED BALANCED GALVANOMETER SYSTEM

William A. Power, Philadelphia, Pa., assignor to Minneapolis-Honeywell Regulator Company, Minneapolis, Minn., a corporation of Delaware Application January 13, 1953, Serial No. 330,945

6 Claims. (Cl. 318—32)

It is a general object of the present invention to provide an electrically damped indicating instrument. More specifically, the invention is concerned with the provision of electrical damping for a force balanced galvanometer type of indicating and control instrument.

In the art of indicating and controlling from an electrical input signal, it is sometimes necessary to provide a control instrument which has considerable output torque for moving appropriate indicating and/or controlling apparatus. As an electrical motor is one way of obtaining an amplified torque from a small input signal, it is desired that such a motor will be moved to an exact position without overshooting the desired position and without delay. The need for anti-hunting apparatus is particularly apparent in a force balance type of apparatus employing a galvanometer which directly actuates a control motor.

It is accordingly a more specific object of the present invention to provide a new and improved galvanometer type of force balance apparatus which is electrically damped to prevent overshooting or hunting.

A further object of the present invention is to provide a new and improved force balance type of galvanometer indicating apparatus wherein a reversible motor force balances a galvanometer movement and electrical damping is provided to maintain the electrical conditions within the apparatus at values which will prevent overshooting and hunting.

A still further object of the present invention is to provide a force balance galvanometer type electrical apparatus having a galvanometer coil with input terminals and with an electrical damping circuit associated with said input terminals to prevent said galvanometer apparatus from overshooting as it is force balanced.

Another object of the present invention is to provide, in a force balance galvanometer type of apparatus, an electrical damping circuit which will be effective to damp the operation of the galvanometer apparatus regardless of the direction in which the galvanometer apparatus is displaced by an input signal and wherein a movement of the galvanometer apparatus is also force balanced by an electro-mechanical feedback.

The various features of novelty which characterize this invention are pointed out with particularity in the claims annexed hereto and forming a part of this specification. For a better understanding of the invention, however, its advantages, and specific objects obtained with its use, reference should be had to the accompanying drawings and descriptive matter in which is illustrated and described a preferred embodiment of the invention.

The single figure represents diagrammatically one form that the apparatus of the presenti nvention may assume.

Referring to this single figure, the numeral 10 represents a galvanometer assembly which includes a permanent magnet 11, a symmetrically formed cylindrical core 12, a pair of pole pieces 13 and 14, and an electrical coil 15 which is arranged to be relatively displaced in the permanent field existing on the pole faces of the pole pieces 13 and 14. The coil 15 has a pair of input leads 17 and 18 which are connected to a pair of signal input leads 19 and 20 respectively.

The coil 15 carries a displaceable arm 21 which has on the outer end thereof two sets of electrical contacts 22 and 23. The contact set 22 includes a pair of fixed contacts 24 and 25 and a relatively movable contact 26 which is arranged to be moved by the arm 21. The contact set 23 includes a pair of fixed contacts 27 and 28 and a relatively movable contact 29 which is also arranged to be moved by the arm 21. An insulating strip 30 electrically isolates the contact set 22 from the arm 21 while a further electrical insulating strip 31 is positioned between the contact set 22 and contact set 23 to isolate these two sets.

Controlled by the operation of the electrical contact set 23 is a reversible motor 35 which is arranged to have an output connection to a suitable indicator 36 and to a force balance mechanism 37. This force balance mechanism includes a rack 38 and a pinion gear 39, the latter of which is directly positioned by the motor 35 through appropriate gearing, not shown. Connected between the rack 38 and the arm 21 is a resilient force balancing member in the form of a spring 40.

Controlled by the actuation of the switch set 22 is an electrical circuit for a damping source for the galvanometer coil 15, shown in this instance as a battery 42 with a grounded center tap at 43. While a battery has been shown, it will be obvious that any suitable direct current power source may be utilized. The electrical circuit for this source 42 includes an adjustable resistor 43 and a condenser 44. The condenser 44 is connected in series with a further adjustable resistor 45 across the input leads 17 and 18 to the galvanometer coil 15.

In considering the operation of the present apparatus, let it first be assumed that the apparatus is in a condition in which it is shown upon the drawing. That is, the apparatus is balanced so that the force exerted by the spring 40 upon the arm 21 is exactly equal to the electrical torque developed within the galvanometer coil 15 due to an input signal. With this balanced state in existence, the contacts 26 and 29 will be mechanically centered between the fixed contacts 24 and 25 and the contacts 27 and 28 so that there will be no electrical circuit completed by the switch contacting sets 22 or 23. As long as this balanced state remains, the apparatus will maintain the position shown.

In the event that there should be a change in the electrical signal on the input conductors 19 and 20, this change will be fed through the leads 17 and 18 to the coil 15 and, if there is an increase in the input signal, the arm 21 will be displaced in a counter-clockwise direction. With the movement of the arm 21 in a counter-clockwise direction, the movable contact 29 will move into engagement with contact 27 so that an electrical circuit will be completed to the motor 35 from an input lead 50 through the contact 29, contact 27, lead 51, to the motor 35, and back through lead 52 to the input source. With an energizing signal applied to the motor 35, this motor will rotate in a direction to increase the force balancing action of the spring 40 which will mean that the gear 39 will be rotated in a counter-clockwise direction to move the rack 38 downwardly. The movement of the rack will stress the spring 40 and a force balancing action will be applied to the arm 21. This force balancing action through the rack 38 and spring 40 will continue until such time as the arm 21 has moved the contact 29 to an intermediate position between the contacts 27 and 28 to open the driving circuit for the motor 35.

In the event that the magnitude of the input signal on the input conductors 19 and 20 should decrease, the coil 15 will be displaced in the opposite direction so that the coil will run in a clockwise direction due to the fact that the force of the spring 40 will be greater than that of the torque produced in the coil 15. This will mean that the movable contact 29 will engage the contact 28 so that an energizing circuit will be completed in the motor 35 from the input power source lead 50 through the contact 29, fixed contact 28, lead 54, motor 35, and lead 52 back to the input source.

In the operation explained thus far, it has been assumed that the mechanical inertia of the apparatus has not been sufficient when energized from one unbalance state to carry it beyond the balance point to cause reverse energization of the motor 35. Such carry over will not occur if the spacing between the fixed contacts 27 and 28 is sufficient that the mechanical inertia will not cause the system to coast from one contact to the other. As it is desired that the distance between the contact 27 and the contact 28 be less than the normal coasting distance due to mechanical inertia, some provision must be made to prevent the overshooting of the motor 35 and the contact 29. If some damping provision is not made, there is of necessity a wide dead spot about the balance position which makes for inaccurate indication and control.

The damping circuit provisions of the present apparatus permits very close spacing of the contacts 27 and 28 with respect to the movable contact 29. The operation of the damping circuit will be understood by following through an unbalance and rebalancing operation. Assume the condition where the input signal is increased so that the coil 15 moves in a counter-clockwise direction; when the contact 29 engages contact 27, the contact 26 will engage the contact 24. When the contact 26 engages contact 24 an electrical circuit is completed from the direct current source 42 to the condenser 44 and this circuit may be traced from the right end terminal of the battery 42 through conductor 56, contact 24, contact 26, conductor 57, adjustable resistor 43, condenser 44, conductor 19, and ground back to the grounded center tap 43 in the power source 42. With the current flowing in the last traced circuit, the condenser 44 will be charged and the amount of the charge will be dependent upon the time length that the current is flowing. As this time length will also be dependent upon the time that the apparatus is unbalanced, it will be seen that the charge will be proportional to the time that the motor 35 is in operation or energized by the contact set 23.

In parallel with the circuit for charging the condenser 44 is a circuit which may be traced from the right end terminal of battery 42 through conductor 56, contact 24, contact 26, conductor 57, resistor 43, resistor 45, conductor 18, coil 15, conductor 17 and conductor 19 to ground 43 back to the tap on battery 42. As this current flow will be dependent somewhat upon the magnitude of the charge on condenser 44, it will be seen that this current magnitude will tend to be proportional to the time length that the contact 24 engages contact 26.

Assuming the input signal has increased in magnitude, it is desired that the current through coil 15 be less than the actual current originating from the source. With a reduced current on the coil 15, the torque exerted by the coil 15 will be less than the actual torque that would normally be present from the input error signal. This will further mean that the arm 21 will reach a balanced condition prior to the time that the normal input signal would indicate a balanced condition has been reached. As soon as the movable contact 26 breaks from contact 24, the condenser 44 will discharge through the resistor 45 and coil 15 to maintain the current flow at a value which will prevent the coil 15 from remaking the contact which was causing motor rotation. The decay rate is selected to match the system inertia to attain maximum damping. When the motor inertia has been dissipated and the charge on the condenser 44 has been dissipated, the apparatus will be in a balanced condition with the moving contacts 29 and 26 centered between their respective fixed contacts.

It will be obvious that the amount of damping present in the circuit may be adjusted by the adjustable resistors 43 and 44 which will control the charge on the condenser 44 and the magnitude of the current which is to flow in the coil 15 due to the damping source. This current magnitude is selected to give a false balance which will cause the motor to coast to a stop at the exact balance. This current magnitude is dependent upon the electro-mechanical inertia characteristics of the apparatus.

In the event that the input signal should decrease, it is desired that the damping current from the source 42 be in a direction opposite the direction of the change. Thus, the damping current should add to the decreasing current from the input so that the net result will be the opening of the switch contacts prior to the reaching of an actual balance. As with an increasing signal, the time constant for the charge and discharge circuit of the condenser 44 is matched to the mechanical inertia of the apparatus.

Representative, but not limiting values, for the components of the apparatus may be as follows:

| | | |
|---|---|---|
| Input signal to coil 15 | milliamperes | 3–15 |
| Coil 15 resistance | ohms | 350 |
| Resistor 45 | megohms | 0.3 |
| Resistor 43 | do | 0.3 |
| Condenser 44 | microfarads | 0.083 |
| Source 42 between end terminals | volts | 300 |

While in accordance with the provisions of the statutes, there has been illustrated and described the best form of the embodiment of the invention known, it will be apparent to those skilled in the art that changes may be made in the forms of the apparatus without departing from the spirit of the invention as set forth in the appended claims, and that in some cases certain features of the invention may be used to advantage without a corresponding use of other features.

Having now described the invention, what I claim as new and desire to secure by Letters Patent is as follows:

1. Electrical apparatus comprising, an electrical coil displaceable in a magnetic field in accordance with an input signal, a displaceable arm carried by said coil and having thereon two sets of electrical contacts, a reversible motor arranged to be reversibly controlled by one set of said contacts, and a coil movement damping circuit adapted to be controlled by said second set of contacts, said coil damping circuit comprising an auxiliary source of power and a chargeable electrical impedance associated with the input of said coil.

2. In an electrical force balance apparatus, the combination comprising, a galvanometer device, and a displaceable arm attached to said galvanometer device and arranged to be moved thereby, a set of electrical contacts carried by said arm and arranged to reversibly control an electrical motor, a resilient force balancing member connected between said arm and said motor and arranged to be stressed in accordance with movement of said motor, a second set of electrical contacts controlled by the movement of said arm, a damping circuit for said galvanometer device comprising a condenser connected across the input of said device which is arranged to be reversibly charged by a source of power controlled by said second set of contacts.

3. A damping circuit for a galvanometer comprising, a source of power, a condenser connected across input leads to said galvanometer and across the terminals of a control signal source, a set of switch contacts interposed between said condenser and said source of power, means including said galvanometer for mechanically operating said set of switches to complete a current path between said source and said condenser with the current flow from said condenser being in a direction to oppose the magnitude change in actuating current on said galvanometer.

4. Electrical apparatus, comprising in combination, a deflecting coil galvanometer device having an input connection to said coil, a first set of switch contacts arranged to be mechanically actuated by movement of said coil, a reversible motor having the current flow thereto controlled by said switch contacts, a mechanical force balancing connection between said motor and said coil, said connection including a resilient member, a damping circuit for said coil said damping circuit comprising a condenser and a resistor connected in series across the input to said coil, a direct current signal source, a second set of switch contacts arranged to be actuated by the displacement of said coil, means connecting said switch contacts in a circuit to control the charging of said condenser by said signal source, said second switch contacts being actuated in a direction dependent upon the displacement of said coil and when so actuated causing a charging current to flow in a direction to said condenser which is dependent upon the directional change in magnitude of the input signal effecting displacement of said coil.

5. In an electrical positioning apparatus, the combination comprising, an electrical galvanometer device having a displaceable coil with a pair of input terminals, a set of reversing switch contacts actuated by said coil to control a reversible motor, a mechanical force balancing feedback connection from said motor to said coil, and a damping circuit for said apparatus, said damping circuit comprising, a series connected resistor and condenser connected in parallel across said input to said coil, a source of damping signal, a second set of reversible switch contacts actuated by said coil, and a reversible energizing circuit for said condenser including said source, said second set of switch contacts, and an adjustable resistor, said adjustable resistor varying the rate at which said condenser is charged by said source.

6. Electrical indicating apparatus comprising in combination, an electrical galvanometer device having a displaceable coil with an input thereto, a first set of electrical switching contacts having a single pole double-throw action, means including said coil for actuating said contacts to one position or the other, a reversible motor controlled by the operation of said switch contacts, a force balancing connection including a resilient member connected between said motor and said coil so that said motor, when operative, tends to force balance said coil so that said motor will no longer be operative, and a damping circuit associated with the input of said coil, said damping circuit comprising a condenser and a resistor connected in series across said input, a source of damping potential, and a second set of switch contacts having a single pole double-throw action, means including said second set of switch contacts for connecting said source to charge said condenser when said coil is operating said first contacts and driving said motor, said condenser being charged in a direction which produces a current flow in said coil which is opposite the sense of change of the input signal to said coil so that as said motor approaches a rebalance condition, the current flow from said source causing said coil to assume a balanced condition prior to the occurrence of a natural balance with the inertia of said force balancing system including said motor being sufficient to carry said coil to an actual balance and the charge on said condenser maintaining the damping signal for a time proportional to the mechanical inertia of said apparatus.

References Cited in the file of this patent

UNITED STATES PATENTS

| | | |
|---|---|---|
| 2,376,598 | Jones | May 22, 1945 |
| 2,674,707 | De Mott | Apr. 6, 1954 |